United States Patent
Ohmi et al.

(10) Patent No.: US 6,871,803 B1
(45) Date of Patent: Mar. 29, 2005

(54) VALVE WITH AN INTEGRAL ORIFICE

(75) Inventors: Tadahiro Ohmi, 1-17-301, Komegahukuro 2-chome, Aoba-ku, Sendai-shi Miyagi 980-0813 (JP); Kouji Nishino, Osaka (JP); Nobukazu Ikeda, Osaka (JP); Michio Yamaji, Osaka (JP); Ryousuke Dohi, Osaka (JP); Eiji Ideta, Osaka (JP); Takashi Hirose, Osaka (JP)

(73) Assignees: Fujikin Incorporated, Osaka (JP); Tadahiro Ohmi, Sendai (JP)

(*) Notice: Subject to any disclaimer, the term of this patent is extended or adjusted under 35 U.S.C. 154(b) by 208 days.

(21) Appl. No.: 10/048,597

(22) PCT Filed: Jun. 5, 2000

(86) PCT No.: PCT/JP00/03657

§ 371 (c)(1),
(2), (4) Date: Feb. 1, 2002

(87) PCT Pub. No.: WO01/94824

PCT Pub. Date: Dec. 13, 2001

(51) Int. Cl.[7] .............................. B05B 1/00; B05B 1/30; F02M 47/02
(52) U.S. Cl. ...................... 239/596; 239/88; 239/533.3; 239/585.1; 239/585.5
(58) Field of Search ............................. 239/596, 88–92, 239/95, 600, 585.1–585.5, 533.2, 533.3, 533.14; 251/129.15, 129.21, 127

(56) References Cited

U.S. PATENT DOCUMENTS

| | | | | |
|---|---|---|---|---|
| 3,833,015 A | * | 9/1974 | Kneuer | 137/334 |
| 4,073,311 A | * | 2/1978 | McGeachy | 137/513.3 |
| 4,643,359 A | * | 2/1987 | Casey | 239/585.4 |
| 5,301,712 A | * | 4/1994 | Treichel et al. | 137/375 |
| 5,524,865 A | * | 6/1996 | Uchisawa et al. | 251/331 |
| 6,027,037 A | * | 2/2000 | Murakami et al. | 239/88 |
| 6,357,677 B1 | * | 3/2002 | Ren et al. | 239/585.4 |

FOREIGN PATENT DOCUMENTS

| | | | | |
|---|---|---|---|---|
| JP | 411166636 A | * | 6/1999 | F16K/1/22 |
| WO | WO-99/63412 A1 | | 12/1999 | |

* cited by examiner

*Primary Examiner*—Davis Hwu
(74) *Attorney, Agent, or Firm*—Griffin & Szipl, P.C.

(57) ABSTRACT

A valve with an integral orifice for use in gas feeding equipment provided with a pressure-type flow volume control device to be employed for manufacturing of semiconductors and chemical goods. The valve with an integral orifice has the excellent flow rate control characteristics by improving the processing accuracy of the orifice and preventing the distortion of the orifice at the time of assembling. The orifice is formed in a stainless steel made orifice disc. The metal-made orifice disc with the orifice formed by separate processing and the synthetic-resin-made valve seat body are removably assembled, wherein the orifice disc and the synthetic resin made valve seat body are fixed airtight to the valve main body by pressing the valve seat body via a metal inner disc.

15 Claims, 7 Drawing Sheets

VALVE WITH AN INTEGRAL ORIFICE

FIELD OF THE INVENTION

The present invention relates to a valve with an integral orifice for use in gas feeding equipment and the like that is provided with a pressure-type flow rate control device for semi-conductor manufacturing devices, chemical goods manufacturing equipment and the like.

BACKGROUND OF THE INVENTION

Figure 9:
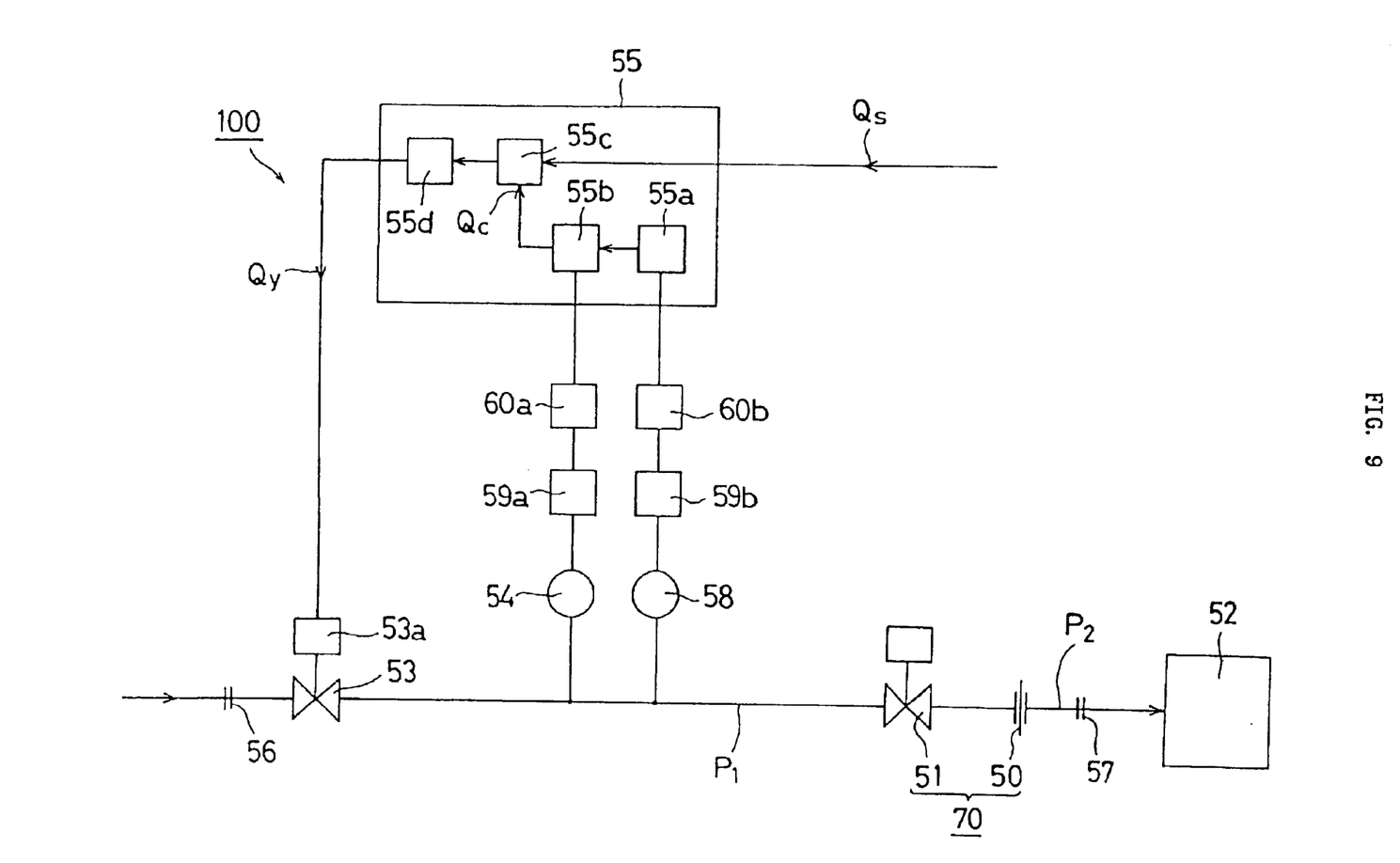
FIG. 9 illustrates one example of the use of a valve with an integral orifice in a conventional pressure-type flow rate control device.

Gas feeding equipment having a pressure-type flow rate control device for use in semi-conductor manufacturing devices and chemical goods manufacturing equipment is disclosed in WO 99/63412 A filed earlier by the present applicants. As shown in FIG. 9, the gas feeding equipment is designed to feed gas to a process 52 through an orifice corresponding valve 51, whilst controlling the gas flow rate such that a pressure $P_1$ upstream of an orifice 50 of more than twice the pressure $P_2$ downstream of the orifice 50 is maintained. Particularly, the pressure-type flow rate control device 100 comprises a control valve 53 which receives gas from a gas feeding source, said orifice corresponding valve 51 installed on the downstream side of the control valve 53, a pressure detector 54 installed between the aforementioned control valve 53 and the orifice corresponding valve 51, the orifice 50 installed at the downstream side of a valve mechanism part of the orifice corresponding valve 51, and a computer control device 55 which calculates the flow rate by $Qc=KP_1$ (K=a constant) from the pressure $P_1$ detected by the aforementioned pressure detector 54, and, at the same time, outputs as a control signal Qy the difference between a flow rate command signal Qs and a computed flow volume Qc to a driving part 53a of the control valve 53, thus controlling the flow rate of the gas to be fed to the process 52 by controlling the opening/closing mechanism of the control valve for adjusting the pressure $P_1$.

Referring to FIG. 9; 55a is a temperature correction circuit; 55b a flow rate computation circuit; 55c a comparison circuit; 55d an amplification circuit: 56 a gas inlet; 57 a gas outlet; 58 a gas temperature detector; 59a,59b amplifiers, and 60a,60b A/D converters.

Now referring to FIG. 9, the orifice corresponding valve 51 and the orifice 50 are represented as separate items. However, in reality, as shown in FIG. 10, the orifice 50 is integrally fixed in a gas outlet passage $S_2$ of the orifice corresponding valve 51 to form a valve 70 which is equipped with an integral orifice 50 (hereinafter called a valve 70 with an integral orifice).

Figure 10:
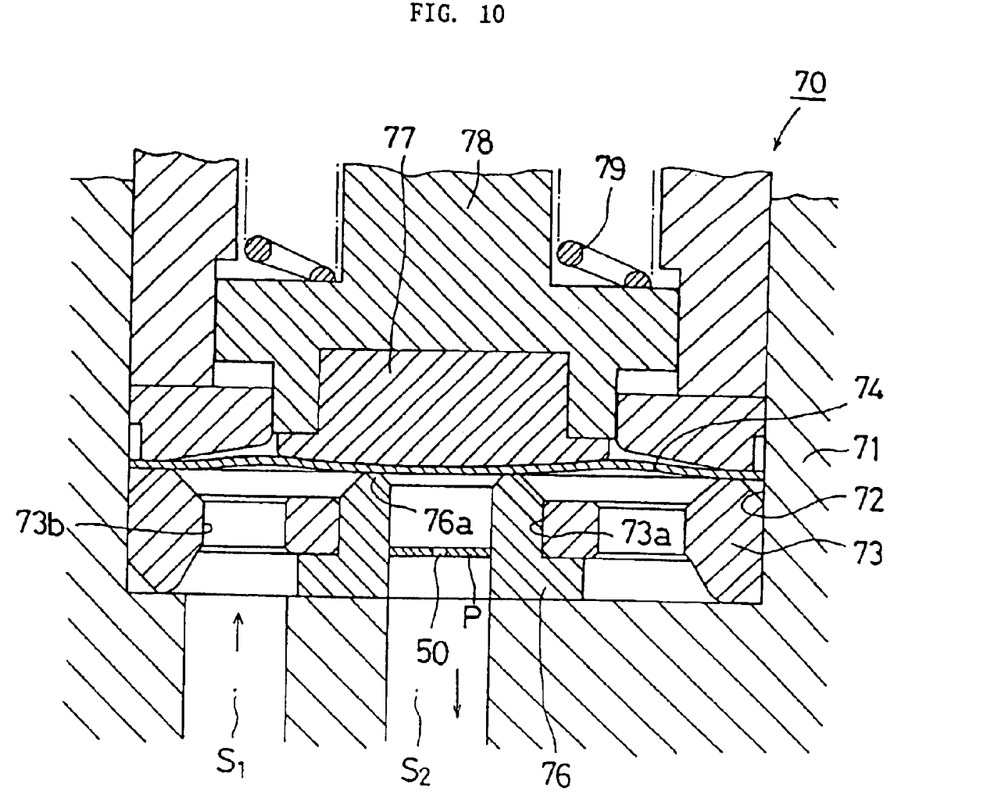
FIG. 10 is a longitudinal sectional view of the main part of the conventional valve with an integral orifice.

FIG. 10 is an enlarged, partial sectional view of the valve part of the afore-mentioned prior art valve 70 with an integral orifice, wherein 71 is a valve main body, 72 a valve chamber formed in the valve main body 71, 73 an inner disc fitted in the valve chamber, 74 a metal diaphragm forming a valve, 76 a seat member made of CTFE (synthetic resin), 76a an annular valve seat, 50 said orifice installed in the seat member 76 defining the valve seat, 77 a valve presser, 78 a shaft (a valve rod), 79 a spring, $S_1$ a gas inlet passage, and $S_2$ said gas outlet passage. Gas flowing in the direction of an arrow from the gas inlet passage $S_1$ flows out of the gas outlet passage $S_2$ through the orifice 50.

Particularly, the valve part of the valve 70 with an integral orifice comprises the disc-shaped inner disc 73 fixed to the bottom of the valve chamber 72 formed in the valve main body 71, the seat member 76 fitted airtightly in a seat member receiving aperture 73a formed at the centre of the inner disc 73, the metal diaphragm 74 provided above the seat member 76, the valve presser 77 which presses the diaphragm 74 from above, and the like.

In addition, at the outer periphery of the inner disc 73, there is formed a gas inlet 73b for communication with the gas inlet passage $S_1$. Gas flows into an air space under the diaphragm 74 through said gas inlet 73b.

The annular valve seat 76a is formed on an upper surface of the seat member 76. Furthermore, the orifice 50 is formed in the gas outlet passage $S_2$ in communication with the valve seat 76a.

Figure 11:
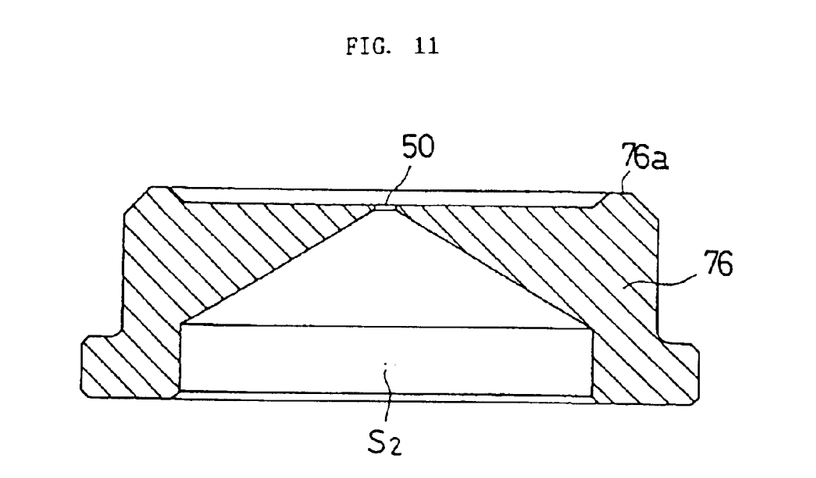
FIG. 11 is a longitudinal sectional view of another example of a conventional valve seat body of a valve with an integral orifice.

FIG. 11 illustrates another example of the seat member 76 (made of PCTFE) in the aforementioned FIG. 10, wherein an annular valve seat 76a is formed on the upper side of the seat member 76 substantially in the shape of a disc. The reverse side of the disc-shaped seat member 76 is formed with a concave recess having a conical shape to make thin the centre of the seat member 76, such that the small orifice 50 is formed in the central thin part.

OBJECTS OF THE INVENTION

With the conventional valve 70 with an integral orifice as shown in FIG. 10, an annular groove is formed on the inner surface of the gas outflow passage $S_2$ of the seal member 76 made of synthetic resin, and the outer periphery of an elastic circular orifice plate P provided with the orifice 50 is forced-fitted into said groove so that the orifice plate P is fixed.

This may cause distortion of the orifice plate P at the time of fitting the orifice plate P into the groove. If the orifice plate P is greatly distorted, then the orifice 50 provided therein is also subjected to distortion, thus causing malfunction of the flow rate control of the pressure-type flow rate control device. As a consequence, the valve with an integral orifice as structured in FIG. 10 has the problem that the orifice plate P cannot be securely fixed. If the orifice plate P is made of metal, then an annular groove with a complicated construction needs to be formed on the inner wall surface of the gas flow passage $S_2$ for firmly securing easily the orifice plate P, thus increasing the cost for processing the seat member 76.

Furthermore, any distortion of the seat member 76 when the synthetic-resin seat member 76 is heated by high temperature gas or is pressed by the inner disc 73 is conveyed directly to the orifice plate P. As a result, even a slight deformation of the seat member 76 causes deformation of the orifice plate P, thereby changing the form (hole shape and hole diameter) of the orifice 50 such that the flow rate control characteristics are changed.

In addition, when the orifice is constructed as illustrated in FIG. 11, the orifice 50 is formed by subjecting the synthetic-resin valve seat 76 to a cutting process. The cutting process generates heat which distorts the shape of the orifice 50, resulting in an uneven shape of the orifice 50. As a result, the flow rate control characteristics of the pressure-type flow rate control device in which the valve with an integral orifice is installed become inconsistent.

It is a primary object of the present invention to provide a valve with an integral orifice, (1) which is not subjected to distortion of the orifice plate at the time of assembling the valve with an integral orifice, (2) which has improved flow rate control characteristics of the pressure-type flow rate control device employing an orifice plate by not allowing the orifice plate to be easily distorted, even when heated by high temperature gas, and (3) which permits easy replacement of the orifice and a reduction of production costs, thus solving the aforementioned problems with the prior art valve with an integral orifice.

DESCRIPTION OF THE PRESENT INVENTION

To achieve the objects of the above-mentioned invention, the present invention provides a valve with an integral orifice which comprises a valve main body made of heat-resistant materials in which are formed gas inflow and outflow passages in communication with a valve chamber having an open upper end, a valve seat body made of synthetic resin which is provided in the valve chamber of the valve main body and defines a gas outflow passage in communication with the gas outflow passage of the aforementioned valve main body and a valve seat, an orifice disc made of heat-resisting materials removably installed in the gas outflow passage of the valve seat body, and an orifice which is formed in the orifice disc to reduce the gas outflow passage of the valve seat body.

Furthermore, one embodiment of the present invention relates to a valve with an integral orifice, wherein the orifice disc is accommodated in a concave recess formed in a lower part of the aforementioned valve seat body, is held between the valve seat body and the valve main body and comprises a thick disc-shape that is provided, in a central part having a gas outflow passage in communication with the gas outflow passage of the valve seat body with a thin orifice plate that is welded to an upper end surface of said thick disc-shape, the aforementioned orifice being formed in the centre of the afore-mentioned orifice plate.

And, another embodiment of the present invention relates to a valve with an integral orifice, wherein an inner disc, made of heat-resistant materials and provided with a gas inflow passage and an aperture for receiving the valve seat body, is inserted into the valve chamber of the valve main body, and the valve seat body, fitted in the aperture for receiving the valve seat body, and the orifice disc, accommodated inside the concave part of the valve seat body, are fixed airtightly to the valve main body by pressing outer circumferential portions of the inner disc from above.

The present invention, in a still further embodiment, relates to a valve with an integral orifice, wherein a clearance $H_1$ between a lower surface of the inner disc and a bottom surface of a valve chamber is larger than a clearance $H_2$ between an upper surface of the concave part of the valve seat body and the upper end surface of the orifice disc, when the inner disc, the valve seat body and the orifice disc are assembled such that the bottom surfaces of the valve seat body and the orifice disc come into contact with the bottom surface of the valve chamber.

The present invention, in yet another embodiment, relates to a valve with an integral orifice, wherein said orifice disc is formed in the shape of a thin plate, is accommodated in a concave recess formed in a lower part of the valve seat body and is held between the valve seat body and the valve main body. Furthermore, the orifice is formed in the centre of the aforementioned orifice plate.

The present invention, in another embodiment, relates to a valve with an integral orifice, wherein said orifice disc is formed in the shape of a plug with a collar, having a plug part adapted to be inserted in the gas outflow passage of the valve seat body and a collar part, and the aforementioned collar part is accommodated in a concave recess formed in a lower portion of the valve seat body and held between the valve seat body and the valve main body. Furthermore, the orifice is formed in the plug part of the aforementioned orifice disc.

The present invention, in a further embodiment, relates to a valve with an integral orifice, wherein said orifice disc is formed in the shape of a plug that is screwed into the gas outflow passage of the valve seat body. The orifice is formed in the afore-mentioned orifice disc.

The present invention, in a still further embodiment, relates to a valve with an integral orifice, wherein said orifice disc is formed in the shape of a plug with a collar, comprising a plug part adapted to be fitted in the gas outflow passage of the valve seat body, and a collar part adapted to be accommodated in a concave recess formed in the valve seat body and held between the valve main body and valve main body, a gas outflow passage in communication with the gas outflow passage of the valve seat body, and an orifice plate being fixed on an upper end part of the plug part by welding. Further, the orifice is formed in the aforementioned orifice plate.

The present invention, in a yet further embodiment, relates to a valve with an integral orifice, wherein the orifice disc comprises a thick disc, formed with a gas outflow passage in communication with the gas outflow passage of the valve main body, and an orifice plate mounted on the upper surface of the thick disc, which orifice disc is accommodated in a concave recess formed in a lower part of the valve seat body and is held between the valve seat body and the valve main body. Further, the orifice is formed in the aforementioned orifice plate.

INDEX OF REFERENCE CHARACTERS

A is a valve with an integral orifice, Y a seal face, X a seal face, Z a seal face, $H_1$ clearance, $H_2$ clearance, 1 a valve main body, 2 a valve seat body, 2a a small diameter part, 2b a large diameter part, 3 an orifice disc, 3a a main body, 3b a disc-shaped concave part, 4 an orifice plate, 5 an orifice, 6 a valve chamber, 7 a gas inflow passage, 8 a gas outflow passage, 9 an inner disc, 10 a gas inflow passage, 11 an aperture for receiving the valve seat body, 11a a small diameter part, 11b a large diameter part, 12 a gas outflow passage of the valve seat body, 13 a concave part for receiving the orifice disc, 13a an annular projection, 14 a valve seat, 15 a gas outflow passage of the orifice disc, 16 a diaphragm, 17 a diaphragm presser, 18 a shaft, 19 a spring, 20 a bonnet insert, 21 a bonnet, 22 a plug part, 23 a collar part, 24 an upper tapered part, 25 an intermediate straight part, 26 a lower tapered part, 27 a female screw and 28 a male screw.

MODES OF CARRYING OUT THE INVENTION

The embodiments of the present invention are hereunder shown in the drawings.

Preferred Embodiment 1

Figure 1:
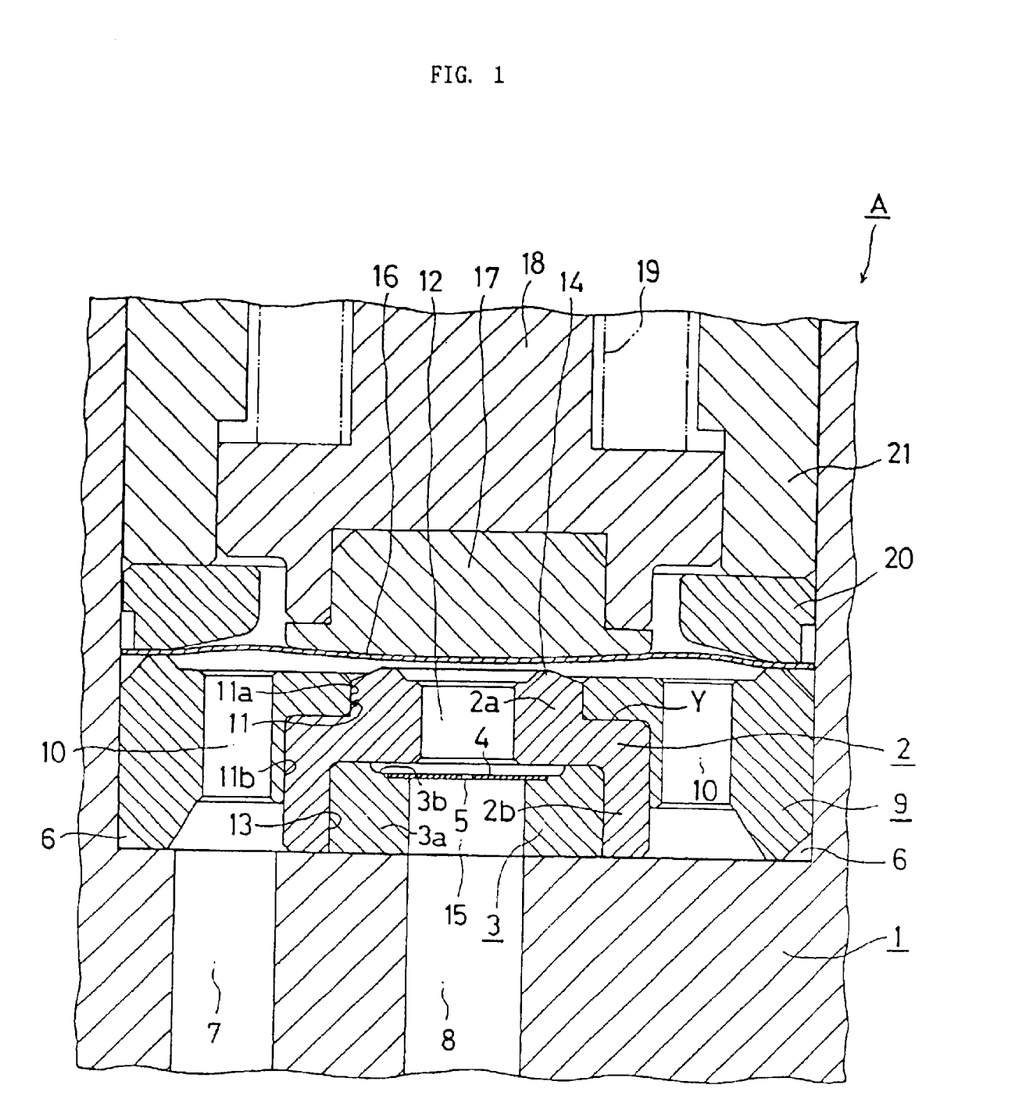
FIG. 1 is a longitudinal sectional view of the main part of a valve with an integral orifice showing a first embodiment of the present invention.
Figure 2:
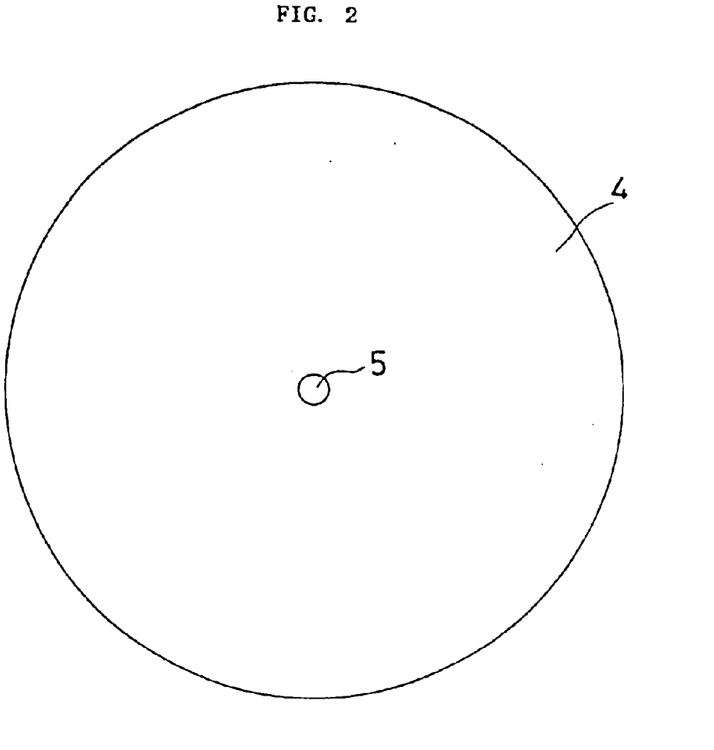
FIG. 2 is a plan view of an orifice plate and an orifice.

FIG. 1 is a longitudinal sectional view of the main part of a valve with an integral orifice showing a first embodiment of the present invention. FIG. 2 is a plan view of an orifice plate and an orifice.

A valve A with an integral orifice comprises a valve main body 1, a valve seat body 2, an orifice disc 3 with an orifice plate 4 welded thereto, an orifice 5 and an inner disc 9 for the main part. It is a valve of the metal diaphragm type and also of the direct touch type.

The aforementioned valve main body 1 made of stainless steel (SUS316L) comprises a valve chamber 6, a gas inflow passage 7 in communication therewith and a gas outflow passage 8. In particular, the valve main body 1 is provided with a valve chamber 6 having an upper opening. At one side of a bottom surface of the valve chamber, there is formed a gas inflow passage 7 in communication with the valve chamber 6, and in the centre of the bottom surface, there is formed a gas outflow passage 8 in communication with the valve chamber 6.

An inner disc 9 is inserted in the valve chamber 6 of the aforementioned valve main body 1. Said inner disc 9 is formed with an approximately round disc shape from stainless steel SUS316L. On both sides of its outer periphery are formed gas inflow passages 10 in communication with the gas inflow passage 7 of the valve main body 1. In a central part of the inner disc 9 is formed an aperture 11 for receiving said valve seat body 2.

As shown in FIG. 1, said aperture 11 comprises an upper small diameter portion 11a and a lower large diameter 11b. A seal face Y is formed at the boundary between the large diameter part 11b and the small diameter pan 11a for pressing the valve seat body 2. Both upper and lower faces of the outer periphery of the inner disc 9 are so-called metal seal surfaces.

The aforementioned valve seat body 2 made of synthetic resin such as PCTFE or the like is formed as a short cylindrical shape comprising an upper small diameter part 2a and a lower large diameter part 2b. At the centre of the valve seat body 2 there is formed a gas outflow passage 12 in communication with the gas outflow passage 8 of the valve main body 1. The lower part of the gas outflow passage 12 is enlarged to form a concave recess 13 adapted to accommodate an orifice disc 3 therein.

Furthermore, an annular valve seat 14 is formed in the upper surface of the small diameter part 2a of the valve seat body 2.

The aforementioned orifice disc 3 comprises a thick, hollow disc shaped main body 3a made of USU316LM and an orifice plate welded thereto. At the centre of the main body 3a of the orifice disc 3 there is formed a gas outflow passage 15 in communication with the gas outflow passage 12 of the valve seat 2, and also with the gas outflow passage 8 of the valve main body 1.

In the upper surface of the main body 3a of the orifice disc, there is formed a dish-shaped concave recess 3b. The orifice plate 4 is fitted in the dish-shaped concave recess 3b. The orifice plate is fixed by welding its outer periphery to the orifice disc body 3a.

The aforementioned orifice plate 4 is a thin disc made of SUS316LW. In this embodiment, 3.5 mm is chosen for the diameter and 0.05 mm (50 μm) for the thickness of the plate.

As illustrated in FIG. 2, there is formed an orifice 5 at the centre of the orifice plate 4 to reduce the gas outflow passage 12 of the valve seat body 2. In particular, in this embodiment of the present invention, the orifice 5 is formed by subjecting both sides of centre of the orifice plate 4 to an etching process, with a minimum diameter of 0.05 nm and a maximum diameter of 0.07 mm.

Figure 3:
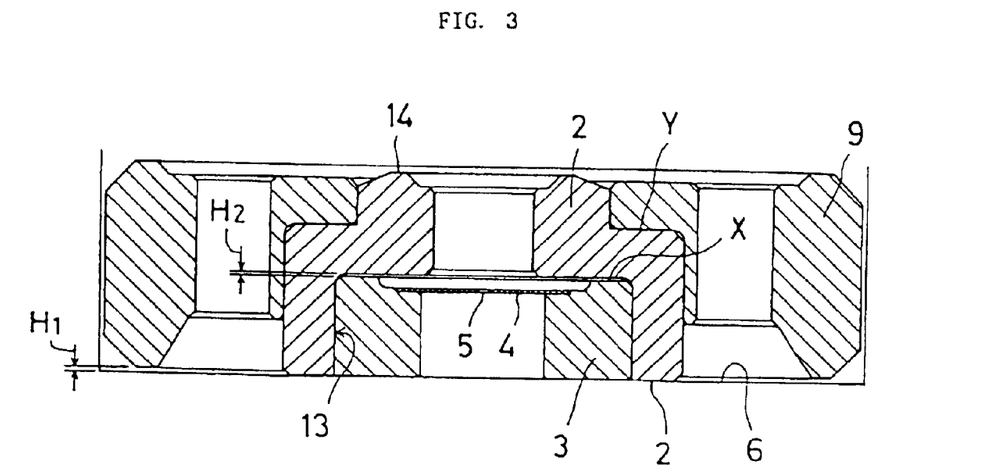
FIG. 3 illustrates the relative heights of a valve seat body, an orifice disc and an inner disc as seen before the inner disc is pressed.

Referring now to FIG. 3, there are shown the relative positions of the valve seat body 2, the orifice disc 3 to which the orifice plate 4 is welded, and the inner disc 9 at the time when these three components are inserted into the valve chamber 6 of the afore-mentioned valve main body 1, before a downward pressing force is applied to the upper part of the outer periphery of the inner disc 9.

As illustrated in FIG. 3, the dimensions of valve seat body 2, the orifice disc 3 and the inner disc 9 are selected such that when the three components are assembled, a clearance of $H_1=0.1-0.2$ mm is formed between the bottom surface of the valve chamber 6 and the lower face of the inner disc 9, whilst a clearance of $H_2=0.02-0.1$ mm is formed between the upper surface of the concave part 13 formed in the valve seat 2 for receiving the orifice disc 3 and the upper face of the orifice disc 3.

Thus, airtight sealing is ensured for the contact faces Y and Z, because the valve seat body 2 is compressed when the inner disc is pressed from above.

The clearance $H_1$ is made larger than the clearance $H_2$. Therefore, when the lower face of the inner disc 9 comes into contact with the bottom face of the valve chamber 6, the contact faces X are sealed airtightly without fail. Above the aforementioned valve seat body 2 and the inner disc 9, there are provided a diaphragm 16, a diaphragm presser 17, a shaft 18, a spring 19, and a driving part (not illustrated).

The diaphragm 16 is made of a thin stainless plate, and is so constructed that it rests on the upper part of the valve seat body 2. The outer periphery of the diaphragm 16 is held between a bonnet 21 and the inner disc 9 via a bonnet insert 20.

A diaphragm presser 17 is positioned above the central part of the diaphragm 16 to press the diaphragm 16. A shaft 18 which is attached to the diaphragm presser 17 is used to move the presser 17 up and down. A spring 19 urges the shaft 18 downwardly so that the diaphragm 16 is forced to rest on the valve seat 14 of the valve seat body 2. A driving part provided at the upper end of the valve main body 1 moves the shaft 18 up and down. An actuator utilizes a high-speed response type solenoid and air pressure is employed as the driving pan.

Next, based on the construction as such, the operation of the valve with an integral orifice according to the first embodiment will be explained.

When the driving part of the valve A with the integral orifice is actuated, the shaft 18 and the diaphragm presser 17 ascend against the action of the spring 19, with the result that the central part of the diaphragm 16 is caused to come away from the valve seat 14 of the valve seat body 2. Then, gas flowing in through the gas inflow passage 7 of the valve main body 1 flows to the gas outflow passage 8 of the valve main body 1 through the gas inflow passage 10 of the inner disc 9, the space between the valve seat 14 of the valve seat body 2 and the diaphragm 16, the gas outflow passage 12 of the valve seat body 2, the orifice 5, and the gas outflow outlet 15 of the orifice disc 3.

When operation of the driving part of the valve A with an integral orifice is stopped, the spring 19 forces the shaft 18 and the diaphragm presser 17 to descend with the result that the central part of the diaphragm 16 comes into contact with the valve seat 14 of the valve seat body 2. Then gas flowing in from the inflow passage 7 of the valve main body 1 is blocked by the diaphragm 16 and cannot flow to the gas outflow passage 8 of the valve main body 1.

The orifice plate 4 can be easily secured because the metal orifice plate 4 is placed in the dish-shaped concave recess 3b formed in the upper face of the orifice disc main body 3a of the metal orifice disc 3 and is laser-welded to the orifice disc main body 3a by its outer periphery.

The dimensions of the orifice disc 3, the valve seat body 2 and the inner disc 9 are calculated such that $H_1=0.1-0.2$ mm and $H_2=0.02-0.1$ mm as illustrated in FIG. 3. Therefore, by tightening the inner disc 9, the sealing faces Y, X and Z are securely sealed.

This makes the installation of the orifice plate 4 easy, and the assembly of the valve with an integral orifice simple. In addition, the orifice plate 4 is not subjected to excessive force at the time of assembly and, hence, is not distorted. Changes in the flow rate control characteristics caused by changes in the orifice form do not occur.

Preferred Embodiment 2

Figure 4:
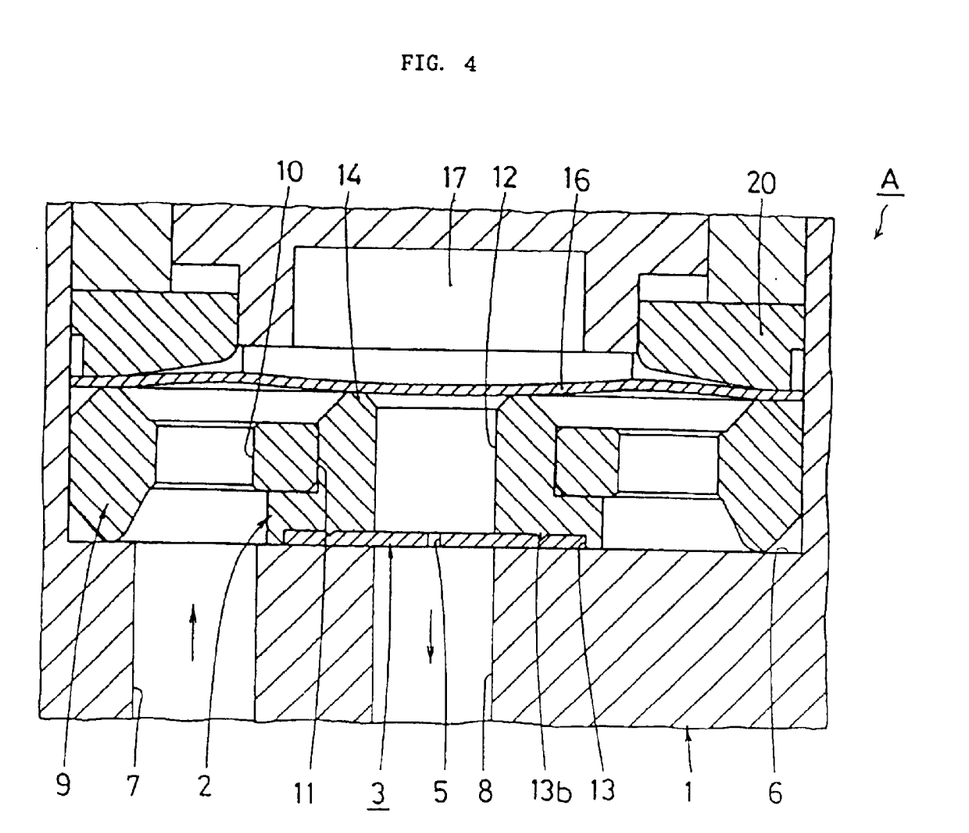
FIG. 4 is an enlarged, longitudinal sectional view of the main part of a valve with an integral orifice according to a second embodiment of the present invention.

A second embodiment of the present invention will be explained by reference to FIG. 4.

In the second embodiment of the present invention, there are formed: a shallow concave recess 13 to accommodate an orifice disc 3 at a lower end of the valve seat body 2 made of synthetic resin; and an annular projecting part 13b that is formed on the lower end face of the valve seal body 2.

An orifice disc 3 comprising a thin, stainless circular plate is accommodated in the concave recess 13 of the valve seat body 2 and is held between the projecting part 13b of the valve seat body 2 and the valve main body 1. The dimensions of the orifice disc 3 are 3.5 mm in diameter and 0.05 mm (50 μm) in thickness. All the other features, except the features for holding the aforementioned orifice disc 3 of the valve A with an integral orifice, are the same as those in the first embodiment.

Preferred Embodiment 3

Figure 5:
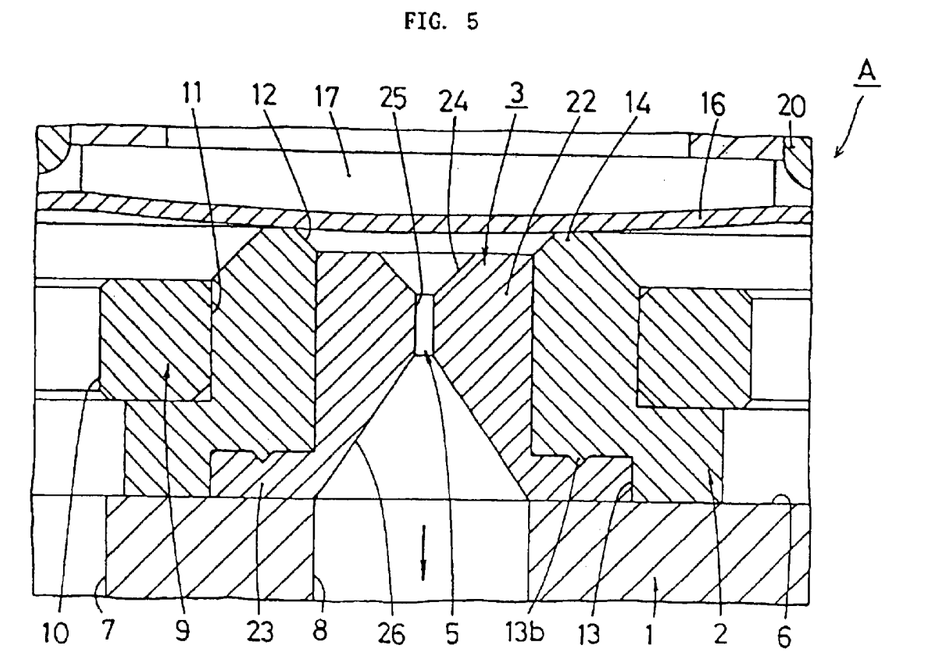
FIG. 5 is an enlarged, longitudinal sectional view of the main part of a valve with an integral orifice according to a third embodiment of the present invention.

A third embodiment of the present invention will be explained with reference to FIG. 5. With the third embodiment, an orifice 5 is formed directly and integrally in the orifice disc 3, with no orifice plate 4 as per the first embodiment (FIG. 1) being used.

Particularly, the orifice disc 3 comprises a plug part 22 adapted to be fitted in the gas outflow passage 12 of the valve seat body 2, and a collar part 23 adapted to be accommodated in a concave recess 13 of the valve seat body 2 and held between the valve seat 2 and the valve main body 1. An orifice 5 is formed in the plug part 22 of the orifice disc 3.

At the lower end of the valve seat body 2, are formed the concave recess 13 for accommodating the collar part 23 of the orifice disc 3, and an annular projecting part 3b. The collar part 23 of the orifice disc 3 is held airtight between the projecting part 13b of the valve seat body 2 and the valve main body 1.

The orifice 5 is formed in the centre of the plug part 22 of the orifice disc 3, and comprises an upper tapered pan 24, whose diameter gradually shrinks towards its lower end, an intermediate straight part 25, and a lower tapered part 26 whose diameter gradually expands towards its lower end.

Preferred Embodiment 4

Figure 6:
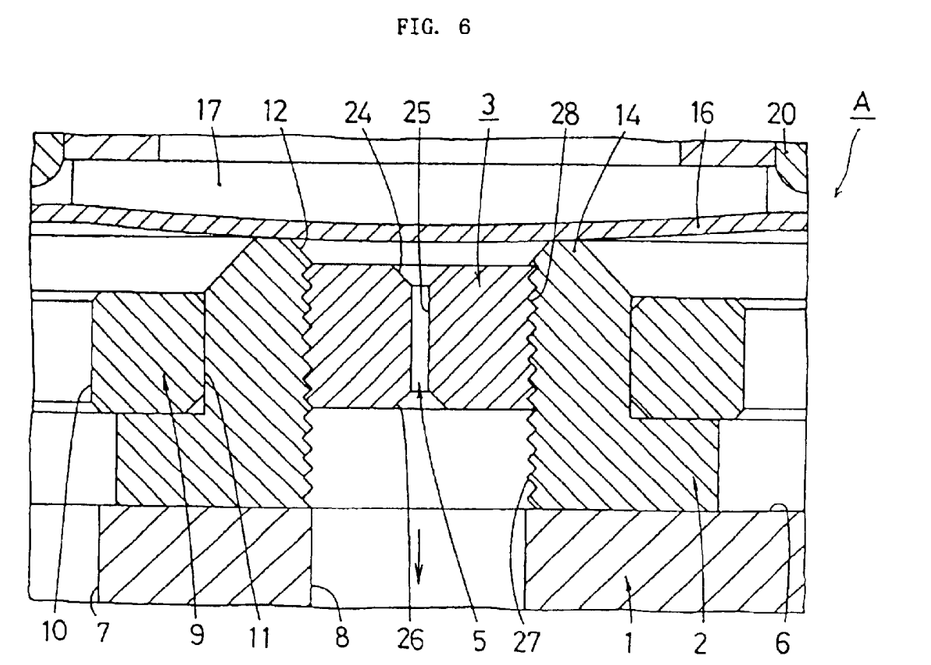
FIG. 6 is an enlarged, longitudinal sectional view of the main part of a valve with an integral orifice according to a fourth embodiment of the present invention.

A fourth embodiment of the present invention will be explained with reference to FIG. 6.

As with the fourth embodiment, the orifice disc 3 is made in the shaped of a plug and is screwed into the gas outflow passage 12 of the valve seat body 2, and the orifice 5 is formed at the centre of the orifice disc 3. In particular, a female screw-thread 27 is formed in the gas outflow passage 12 of the valve seat body 2, and a male screw-thread 28, which engages the aforementioned female screw-thread 27, is formed on the outer surface of the orifice disc 3. An orifice 5 is formed in the centre of the orifice disc 3, and defines an upper tapered portion 24, whose diameter gradually shrinks towards its lower end, an intermediate straight pan 25, and a lower tapered part 26, whose diameter gradually expands towards its lower end.

Preferred Embodiment 5

Figure 7:
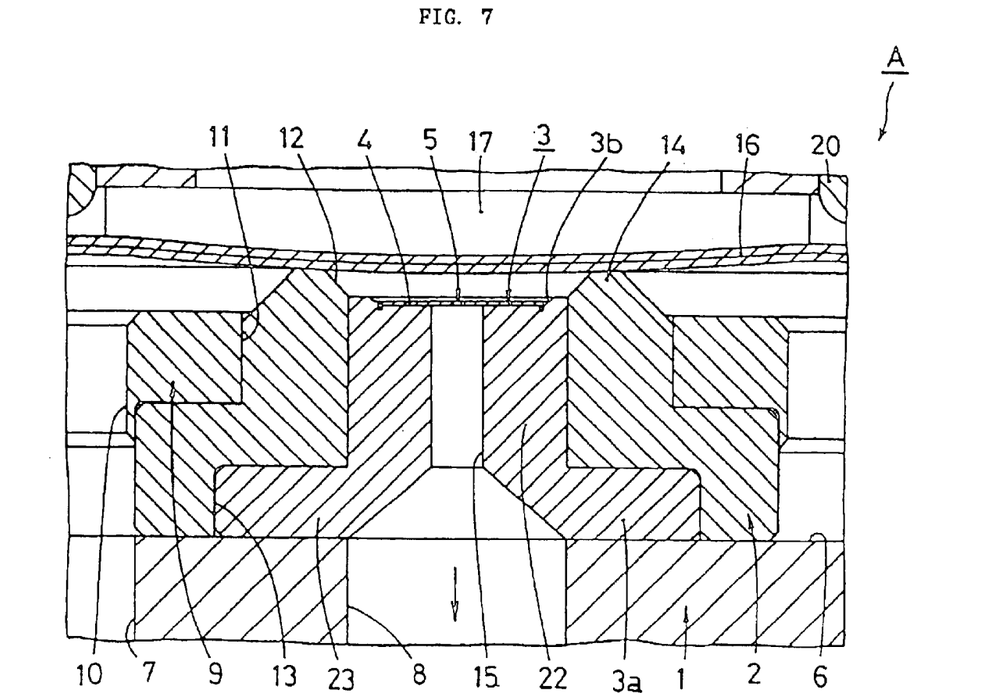
FIG. 7 is an enlarged longitudinal sectional view of the main part of a valve with an integral orifice according to the fifth embodiment of the present invention.

A fifth embodiment of the present invention will be explained with reference to FIG. 7. In the fifth embodiment, the orifice disc 3 shown in FIG. 1 is formed in the shape of a cylinder with a collar portion as shown in FIG. 7. This allows the position of an orifice plate 4 that is secured to the main body 3a of the orifice disc 3 to be raised in height.

In particular, the orifice disc 3 formed in the shape of a cylinder comprises a plug portion 22 adapted to be fitted in the gas outflow passage 12 of the valve seat body 2, a collar portion 23 adapted to be received in a concave recess 13 formed in the valve seat body 2 and held between the valve seat body 2 and the valve main body 1, and a gas outflow passage 15 in communication with the gas outflow passage 12 of the valve seat body 2.

The orifice plate 4 is placed in the dish-shaped concave recess 3b, steps being formed on the upper surface of the main body of the orifice disc 3, and is fixed by laser-welding. An orifice 5 is formed in the orifice plate 4.

Preferred Embodiment 6

Figure 8:
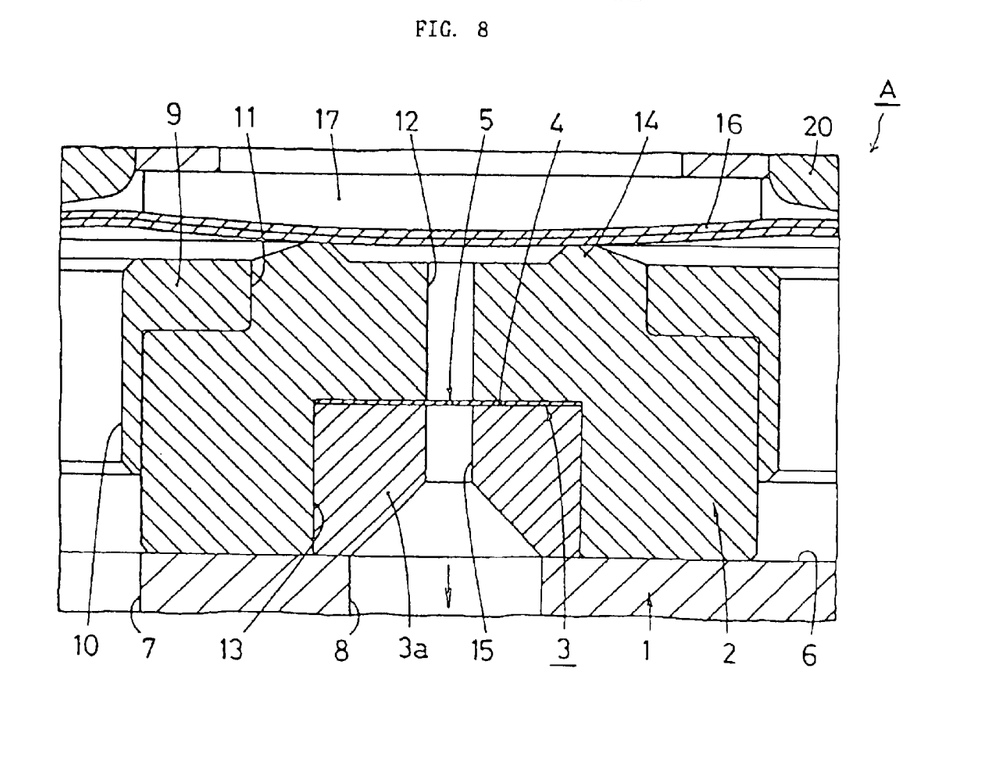
FIG. 8 is an enlarged, longitudinal sectional view of the main part of a valve with an integral orifice according to a sixth embodiment of the present invention.

A sixth embodiment of the present invention will be explained with reference to FIG. 8. In the sixth embodiment, as shown in FIG. 8, an orifice plate 4 is constructed such that it is pressed between a synthetic-resin made valve seat body 2 and a main body 3a of an orifice disc 3, and laser welding as used in the first embodiment in FIG. 1 is not necessary.

The main body 3a and a thin, disc-shaped orifice plate 4 forming the orifice disc 3 are fitted in a concave recess 13 of the valve seat body 2 and are held between the valve main body 1 and the valve seat body 2.

The gas outflow passage 15 of the orifice disc 3 comprises a straight portion whose diameter is the same as that of the outflow passage 12 of the valve seat body 2, and a tapered part whose diameter gradually expands towards its lower end. The orifice disc 3 is made of stainless steel (SUS316L). However, it could be made of a synthetic resin such as PFA or the like, as in the case of the valve seat body 2.

With all of the aforementioned embodiments, the valve A with an integral orifice is suitable for use in gas supply facilities having a pressure-type flow rate control device. However, needless to say the valve A with an integral orifice can also be used for other purposes.

With all of the aforementioned embodiments, a valve seat body 2 is secured to a valve main body 1 via an inner disc 9. However, it is also possible to secure the valve seat body 2 directly to the valve main body 1.

Furthermore, with all of the aforementioned embodiments, the orifice disc 3 is made of metal. However, it could also be made of ceramics.

With all of the aforementioned embodiments, the thickness of the orifice plate 4 is 0.05 mm. However, any other thickness could be employed.

With all of the aforementioned embodiments, the orifice 5 is formed by a both-face etching process. However, it could be also formed by a one-face etching process, machine working, or by electro-discharge machining. Similarly, the diameter of the orifice 5 is 0.05 mm. However, needless to say that any other diameter could be used.

Effects of the Invention

As explained above, the present invention achieves excellent effects as follows:

(1) The main part of the valve A with an integral orifice comprises a valve main body, a valve seat body, an orifice disc, an orifice and an inner ring. The orifice disc, which is made of heat-resistant materials separately from the valve seat body, is removably installed in the gas outflow passage of the valve seat body. An orifice is formed in the orifice disc. As a result, thermal distortion is small, thereby making it possible to obtain accurate flow rate characteristics.

(2) The orifice disc made of heat-resistant materials is formed separately from the valve seat body, and the orifice disc is removably fitted in the gas outflow passage of the valve seat body, thus enabling the orifice to be formed in the orifice disc in advance. As a result, it is easier to perform small perforation work on the orifice and to weld the orifice plate to the orifice disc accurately and surely, thus making it possible to reduce costs.

(3) The orifice disc is made of heat-resistant materials separately from the valve seat body, and the orifice disc is removably fitted in the gas outflow passage of the valve seat body, thus enabling the valve seat body to be used as a common part. As a result, by preparing a variety of orifice discs with orifices of different sizes, it is possible to set an appropriate flow rate range merely by changing the orifice disc.

(4) The orifice disc comprises a main body and an orifice plate, and the orifice is formed in the orifice plate. Therefore, even when the thickness of the orifice plate is very thin such, for example, as 50 cm, no distortion occurs owing to gas pressure.

(5) When the orifice is formed in a metal orifice plate by a both-face etching process, the diameter of the orifice can be made small, making it possible to conduct easily small perforation work, for example, to form a 50 $\mu$m orifice.

What is claimed is:

1. A valve with an integral orifice which comprises a valve main body made of heat-resisting materials in which a gas inflow passage and a gas outflow passage in communication with a valve chamber with an open upper end are formed, a valve seat body made of synthetic resin which is fitted in the valve chamber of the valve main body and provided with a gas outflow passage in communication with the gas outflow passage of the aforementioned valve main body and a valve seat, an orifice disc made of heat-resisting materials removably fitted in the gas outflow passage of the valve seat body, and an orifice which is formed in the orifice disc and reduces the outflow passage of the valve seat body, wherein the orifice disc is formed in the shape of a plug and is screwed in the gas outflow passage of the valve sent body, and wherein an inner disc made of heat-resisting materials and provided with a gas inflow passage and a aperture for receiving the valve seat body is inserted into a valve chamber of the valve main body and the valve seat body fitted in the aperture for receiving the valve seat body is fixed airtight to the valve main body by pressing the outer circumferential portions of the inner disc from above.

2. A valve with an integral orifice as claimed in claim 1 wherein the orifice disc is provided at the centre part with a gas outflow passage in communication with the gas outflow passage of the valve seat body, formed in the shape of a thick round disc with a thin orifice plate being welded to the upper end surface thereof, accommodated in a concave part formed at the lower portion of the aforementioned valve seat body, and held between the valve seat body and the valve main body; and the orifice is formed in the centre of the aforementioned orifice plate.

3. A valve with an integral orifice as claimed in claim 2 wherein an inner disc made of heat-resisting materials and provided with a gas inflow passage and a aperture for receiving the valve seat body is inserted into the valve chamber of the valve main body, and the valve seat body fitted in the aperture for receiving the valve seat body and the orifice disc accommodated into the concave part of the valve seat body are fixed airtight to the valve main body by pressing the outer circumferential portions of the inner disc from above.

4. A valve with an integral orifice as claimed in claim 3 wherein a clearance $H_1$ between the lower surface of the inner disc and the bottom surface of the valve chamber is larger than a clearance $H_2$ between the upper surface of the concave part of the valve seat body and the upper surface of the orifice disc when the inner disc, the valve seat body and the orifice disc are so assembled that the bottom surfaces of the valve seat body and the orifice disc come into contact with the bottom surface of the valve chamber.

5. A valve with an integral orifice as claimed in claim 1 wherein a clearance $H_1$ between the lower surface of the inner disc and the bottom surface of the valve chamber is larger than a clearance $H_2$ between the upper surface of the concave part of the valve seat body and the upper surface of the orifice disc when the inner disc, the valve seat body and the orifice disc are so assembled that the bottom surfaces of the valve seat body and the orifice disc come into contact with the bottom surface of the valve chamber.

6. A valve with an integral orifice as claimed in claim 1 wherein the orifice disc is formed in the shape of a thin plate, accommodated in the concave part formed in the lower part of the valve seat body, and held between the valve seat body and the valve main body; and the orifice is formed in the centre of the aforementioned orifice disc.

7. A valve with an integral orifice as claimed in claim 1 wherein the orifice disc is formed in the shape of a plug and has a plug part to be fitted in the gas outflow passage of the valve seat body and a collar part to be received in a concave part formed at the lower portion of the valve seat body and held between the valve seat body and the valve main body; and the orifice is formed in the plug part of the aforementioned orifice disc.

8. A valve with an integral orifice as claimed in claim 1 wherein the orifice disc is formed in the shape of a cylinder with a collar and comprises the plug part to be fitted in the gas outflow passage of the valve seat body, the collar part to be accommodated in the concave part formed in the valve seat body and held between the valve seat body and the valve main body, the gas outflow passage in communication with the gas outflow passage of the valve seat body, and the orifice plate fixed to the upper end of the plug part by welding; and the orifice is formed in the orifice plate.

9. A valve with an integral orifice as claimed in claim 1 wherein the orifice disc comprises a thick, round disc provided with the gas outflow outlet in communication with the gas outflow passage and the orifice plate mounted thereupon, and is accommodated in the concave part formed at the lower part of the valve seat body and held between the valve seat body and the valve main body; and the orifice is formed in the aforementioned orifice plate.

10. A valve with an integral orifice as claimed in claim 1, wherein the orifice disc is accommodated in a concave part of the valve seat body.

11. A valve with an integral orifice as claimed in claim 10, wherein a clearance H1 is provided between a lower surface of the inner disc and a bottom surface of the valve chamber.

12. A valve with an integral orifice, comprising:
- a valve main body made of heat-resisting materials, wherein a gas inflow passage and a gas outflow passage are formed therein in communication with a valve chamber with an open upper end;
- a valve seat body made of synthetic resin, wherein the valve seat body is fitted in the valve chamber of the valve main body, and the valve seat body is provided with a valve seat, and with a gas outflow passage formed in the valve seat body in communication with the gas outflow passage of the valve main body;
- an orifice disc made of heat-resisting materials, wherein the orifice disc is formed in the shape of a plug and is removably fitted to screw in the gas outflow passage of the valve seat body;
- the orifice is formed in the orifice disc, wherein the orifice is smaller than the outflow passage of the valve seat body;
- an inner disc made of heat-resisting materials, wherein the inner disc is provided with a gas inflow passage and an aperture for receiving the valve seat body, and wherein the valve seat body is inserted into a valve chamber of the valve main body, and the valve seat body fits in the aperture for receiving the valve seat body; and
- a diaphragm presser positioned to press a diaphragm to rest on the valve seat, wherein the valve seat body is fixed airtight to the valve main body by the diaphragm presser pressing the valve seat body from above so as to press the outer circumferential portions of the inner disc.

13. A valve with an integral orifice as claimed in claim 12, wherein the orifice disc is accommodated in a concave part of the valve seat body.

14. A valve with an integral orifice as claimed in claim 13, wherein the valve seat body and the orifice disc are fixed airtight to the valve main body by the diaphragm presser pressing the valve seat body from above so as to press the outer circumferential portions of the inner disc.

15. A valve with an integral orifice as claimed in claim 13, wherein a clearance H1 is provided between a lower surface of the inner disc and a bottom surface of the valve chamber.

* * * * *